United States Patent [19]

Yeiser

[11] 3,742,515

[45] June 26, 1973

[54] CHART RECORDER DATA INTEGRATOR

[75] Inventor: John O. Yeiser, Mission Viejo, Calif.

[73] Assignee: Milton Roy Company, St. Petersburg, Fla.

[22] Filed: Aug. 21, 1970

[21] Appl. No.: 65,950

[52] U.S. Cl................. 346/49, 235/183, 346/32, 346/13
[51] Int. Cl................. G01d 1/04, G01d 9/30
[58] Field of Search............... 346/13, 14, 32, 49, 346/66; 235/183; 324/100; 307/235, 271; 331/111

[56] References Cited
UNITED STATES PATENTS

| | | | |
|---|---|---|---|
| 3,449,695 | 6/1969 | Marsh | 307/271 X |
| 2,611,812 | 9/1952 | Hornfeck | 324/100 X |
| 2,834,247 | 5/1958 | Pickels | 346/13 X |
| 2,889,503 | 6/1959 | Chambers | 346/32 X |
| 2,960,378 | 11/1960 | Wickerham | 346/13 X |
| 3,531,633 | 9/1970 | Johnson | 235/183 |

FOREIGN PATENTS OR APPLICATIONS

| | | | |
|---|---|---|---|
| 861,228 | 2/1961 | Great Britain | 346/13 |

Primary Examiner—Joseph W. Hartary
Attorney—Lawrence Fleming

[57] ABSTRACT

An integrator for continuously computing the area under a curve drawn by a chart recorder, and displaying the area information along the edge of the chart. The integrator uses a voltage-to-frequency converter which derives its input from the slidewire circuitry of a potentiometric null-balance recorder of known type. The converter output drives a stepping motor at a rate depending on the ordinate position on the main recording pen. The stepping motor drives a cam which moves an auxiliary pen back and forth, to draw a triangular wave of variable spatial frequency. The area under any selected portion of the chart curve is found by counting cycles of this wave. The converter also delivers a pulse output which may be fed to an external counter, or recorded, as on magnetic tape, for later recovery or for processing with respect to other tapes or data in a digital computer.

3 Claims, 5 Drawing Figures

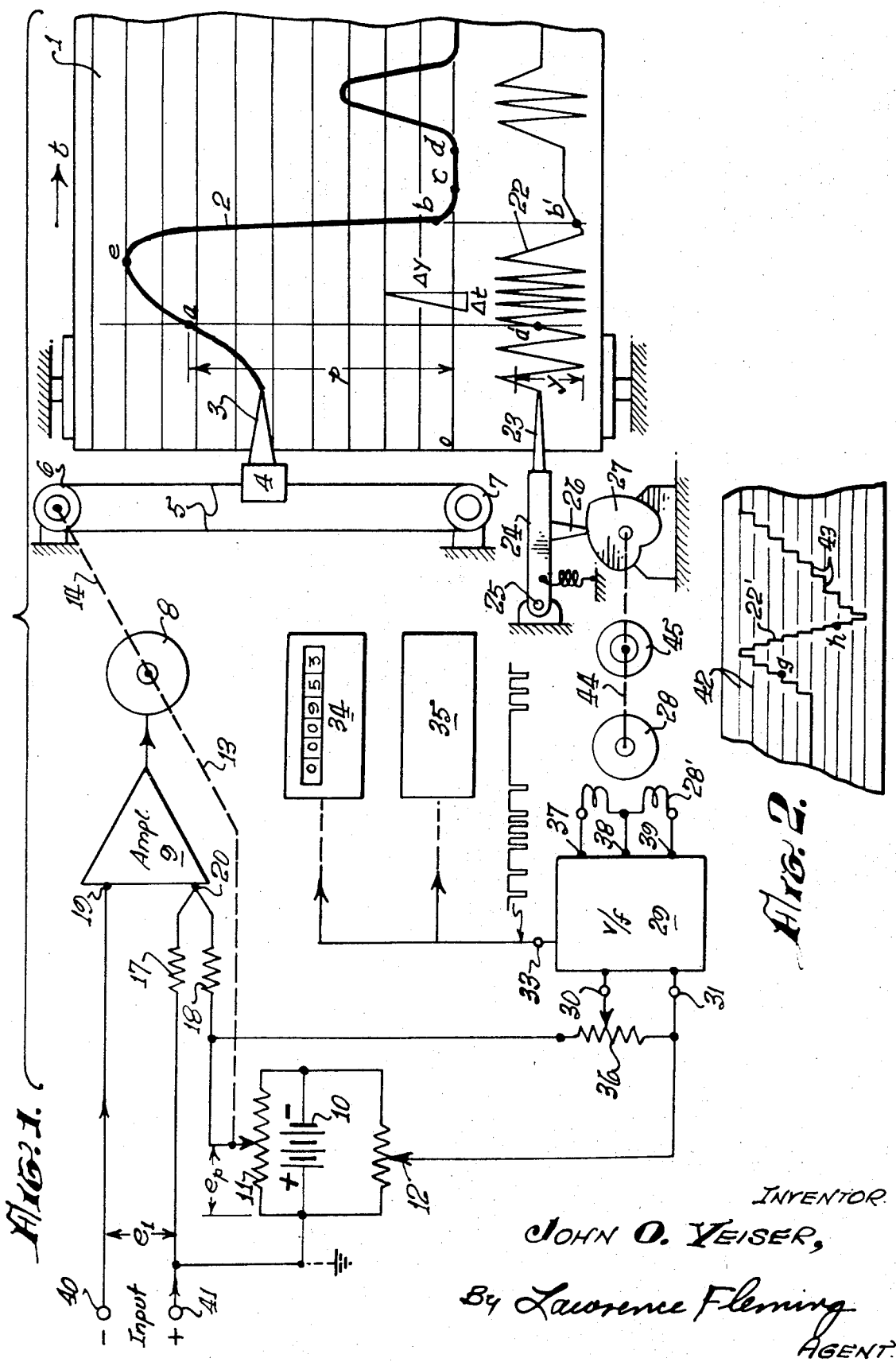

Patented June 26, 1973

INVENTOR.
JOHN O. YEISER,
By Lawrence Fleming
AGENT.

CHART RECORDER DATA INTEGRATOR

BACKGROUND OF THE INVENTION

It is often necessary to determine the area under a curve or a portion of a curve drawn by a chart recording instrument. An example of such usage is found in gas or vapor chromatography, where the chart record shows a series of peaks, each representing a component of the sample which has a different molecular weight. The area under each peak is a measure of the quantity present of the corresponding elutent from the chromatograph column.

The desired areas may be measured on the chart by means of a planimeter. But a much faster method is to use an automatic integrator attached to, or built into, the chart recorder. One such known integrator employs an analog computing mechanism of the type called a ball-and-disc integrator. This mechanism is arranged so that the speed of its output shaft is proportional to the deflection ordinate of the main recorder pen. This shaft rotates a cam which causes an auxiliary pen to trace a zig-zag line or triangular wave along the lower edge portion of the chart. The spatial frequency of this wave is proportional to the main pen ordinate; hence the number of cycles in a given interval is proportional to the area under the main curve. The area is found by counting cycles in the desired interval.

The present invention is an improved system of this general class, having lower cost and greater versatility than the prior art.

BRIEF SUMMARY OF THE INVENTION

This invention is an integrating system for chart recorders which draws an auxiliary trace on the chart in the manner indicated above, from which the areas under any desired portions of the main curve can be found by counting the corresponding numbers of cycles.

Instead of using a mechanical integrator, this invention employs an electrical pulse generator whose output frequency (or repetition rate) is proportional to the electrical input signal to the recorder. The pulse generator, or voltage-to-frequency converter, controls a stepping motor through additional circuitry. The motor, in turn, drives a cam. The cam moves the auxiliary pen back and forth to produce the zig-zag or triangular wave on the chart, displaying the area information.

The output of the pulse generator may also be fed to an electrically-operated counter. also, the output of the pulse generator may be recorded, as on magnetic tape. This pulse record may be used later to reconstruct the original analog chart record, using suitable apparatus; or it may be fed into a digital computer for analysis and/or comparison with other such records.

The invention includes a preferred form of electronic circuitry for generating the pulses and driving the stepping motor. A form of the novel voltage-to-pulse-rate converter circuitry provides highly stable and linear conversion in a unipolar manner, i.e., the pulse rate is zero when the input control voltage is zero, and is accurately proportional to input control voltage of one polarity; with inputs of the opposite polarity, no pulses are generated.

IN THE DRAWINGS:

FIG. 1 is a diagram of a chart recording and integrating system according to the invention, with the main portions of the circuitry in block form;

FIG. 2 is a detail of a portion of an integrator trace;

DETAILED DESCRIPTION OF THE INVENTION

Figure 3:
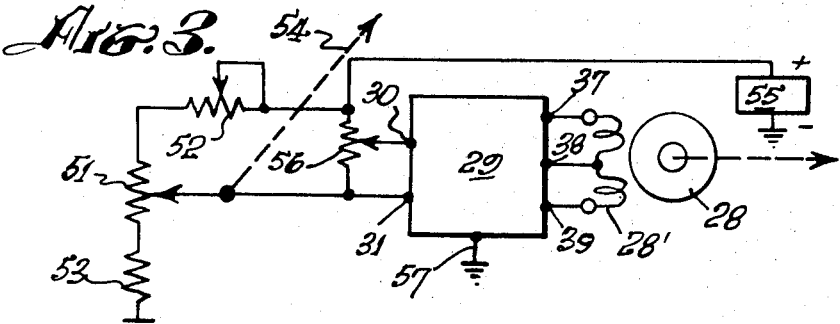
FIG. 3 is a schematic diagram, partly in block form, of a portion of the circuitry for controlling the voltage-to-frequency converter.

FIG. 1 shows diagrammatically a strip chart recording instrument with an integrating device according to the invention. A portion of a chart, such as a conventional paper chart, is shown at 1, with a portion of a record or trace 2, made by a pen or other suitable marking element 3. The pen or marker 3 may be attached to a carrier 4, which is supported movably in a direction crosswise of the chart 1 by means not shown, and moved by means of a flexible cable 5 on pulleys 6, 7, or by any other suitable mechanism. The pen or marking element 3 may be moved by a servo motor 8, linked mechanically to one of the pulleys 6, by any suitable linkage, indicated by dotted line 14.

Alongside the main trace 2 on chart 1 is an auxiliary trace or integrator trace 22 in the general form of a zig-zag line or triangular wave, of varying period. This trace 22 carries the integrator information. It may be recorded by an auxiliary pen or marking element 23, which may be termed the integrator pen. Pen 23 may be attached to an arm 24 pivoted as at 25, and having attached to it a cam follower 26. Follower 26 may follow a cam 27, which is shaped to provide a deflection of pen 23 which is substantially linearly related to the angle of its rotation. Cam 27 is driven by a stepping motor 28, 28', by any suitable means indicated by dotted line 44. A gear reduction box 45 may be interposed between them, as shown.

Turning now to the electrical portion of FIG. 1, the servo motor 8 receives its driving power from an amplifier 9 of any suitable type, in the conventional manner. The input circuit to amplifier 9 contains a battery or other constant voltage source 10 and a slide wire potentiometer 11, connected so that the output voltage $e_p$ of potentiometer 11 opposes the input signal voltage $e_1$ applied to the main input terminals 40, 41. Motor 8 drives potentiometer or slide wire 11 as well as pen 3, through linkages indicated schematically at 13, 14. When an input voltage $e_1$ is applied to terminals 40, 41, a portion of it will appear across the amplifier input terminals 19, 20, via resistor 17. The potentiometer voltage $e_p$ will also appear at these same terminals 19, 20 in opposite polarity, via resistor 18. If the resulting difference voltage is not zero, it will be amplified, and amplifier 9 will drive servo motor 8 in a direction to make the difference substantially zero. The position of the slider of potentiometer 11 will then be a measure of the magnitude of the input voltage $e_1$, and will be so recorded by the pen 3. The above describes the operation of a potentiometer null-balance recorder of known type. In practice the resistors 17, 18 may be unequal in a large ratio, so that a large voltage $e_p$ can balance a small input $e_1$. For example, if resistor 17 is 500 ohms and resistor 18 is 500,000 ohms, a voltage $e_p$ of 5 volts will approximately balance an input $e_1$ of 5 millivolts.

Proceeding now to the integrator portion of the system, a voltage which is a function of the potentiometer voltage $e_p$ is fed to the input terminals 30, 31 of the voltage-to-frequency converter 29. This converter generates electrical pulses which appear at a pulse output terminal 33. The repetition rate is a linear function of the d-c control voltage at the converter input terminals 30, 31. These pulses may be fed into a counter 34, such as a magnetically-operated indicating counter or printing counter. During a given interval, the count will be proportional to the area under the corresponding portion of the curve 2. The pulses may also be recorded on a magnetic tape recorder or other suitable instrument 35.

The function of potentiometer voltage $e_p$ which appears at converter terminals 30, 31, is linear, with a suppressed zero or reference level. This reference level is set by a potentiometer 12 in known manner, and the slope of the function is set by a potentiometer 36.

Another output of converter 9 is substantially a square wave, and appears at output terminals 37, 38, 39. It is connected to the coils 28' of a stepping motor, whose rotor is indicated at 28. This motor drives cam 27 as described above. This square wave, being derived from the pulses, is synchronous with them. The motor 28, 28' advances one step for each pulse. The average speed of the motor is hence proportional to the control voltage at terminals 30, 31.

The term "stepping motor" here means any device which produces successive increments of motion in response to individual pulses, half-cycles, or cycles. Various known stepping motors advance, e.g., 12°, for each cycle of input. Solenoid-and-ratchet devices are known which perform the same function.

Referring to the portion of chart 1 shown in FIG. 1, the integrator wave 22 is interpreted in the following manner. Assume that it is desired to find the area under that portion of curve 2 which lies between points $a$ and $b$. Project from these points to points $a'$ and $b'$ on the integrator trace 22; and count the number of half-cycles or excursions between them, i.e., 9 ½; this represents the desired area. The number is, of course, relative, but can be calibrated with known samples in, for example, a gas chromatograph.

To explain this further, on trace 2 between points $c$ and $d$, the voltage $e_p$ is zero, so rotor 28 does not turn, and this portion of the trace is horizontal. Opposite point $e$, the speed of rotor 28 is relatively high, and so the cycles of integrator trace 22 are relatively close together. If $(dy)/(dt)$ is the slope of trace 22 and $p$ an ordinate of curve 2 as shown in FIG. 1, then $$(dy)/(dt) = p;$$

hence $p = \int y\, dt$, neglecting constants.

FIG. 2 illustrates a portion of another integrator trace, 22', in more detail, to show more clearly how a fraction of one cycle or excursion is measured. The chart may be printed with, say, 10 parallel lines as at 42. Between points $g$ and $h$, FIG. 2, the wave 22' has crossed 10 such lines, so the measure of the area is $10/10 = 1$. Alternatively, the ratio of gear box 40 and the constants of converter 29 may be chosen so that a convenient number, e.g., 10, steps of stepping motor 28, 28' will produce one excursion (half-cycle) of pen 23. The steps will then be visible in the trace 22', as at 43, and can be counted.

A voltage-to-frequency converter, such as 29, of relatively simple and practical design, normally requires a full-scale dc input or control voltage of several volts full-scale. In a potentiometric recorder of the type shown in FIG. 1, the main slide wire 11 often has such a voltage maintained across it by source 10, of, e.g., 5 volts; hence the control voltage for converter 29 may be taken directly from the output $e_p$ of slide wire 11, as in FIG. 1.

In some potentiometric recorders, however, there is a much smaller voltage, such as 10 millivolts, across the main slide wire. In such instruments there is usually provided an additional potentiometer, called a retransmitting slide wire, mechanically linked to the main slide wire. To use the integrator of the invention is such instruments, the converter 29 may be controlled from the retransmitting slidewire as in FIG. 3.

In FIG. 3, the retransmitting slide wire 51 has its slider linked mechanically to the main slide wire of a recorder (not shown) by means indicated by dotted line 54. A suitable dc voltage, such as 5 volts, is developed across slide wire 51 by a power supply 55 of any suitable type, through resistors 52, 53. Adjustable resistor 52 is provided for zero adjustment, and a potentiometer 56 for adjustment of the gain, or slope of the converter function, in known manner. The power supply 55 may be the same supply that serves the circuitry of converter 29, which typically may deliver 20 volts. The voltage across retransmitting slide wire 51 may be reduced to, say, 5 volts by resistor 52. The ground connections on supply 55, resistor 52, and converter 29 (at 57) may all be common.

In the more common case where the voltage across the main slide wire is relatively large, as in FIG. 1, it is necessary to use a floating power supply on the converter 29. This is the arrangement shown in the schematic of FIG. 4. The converter circuitry is the same for either type of recorder; the difference being that in the former case one side of the converter supply 90 (FIG. 4) is grounded, and in the latter (FIG. 1), it is not.

Figure 4:
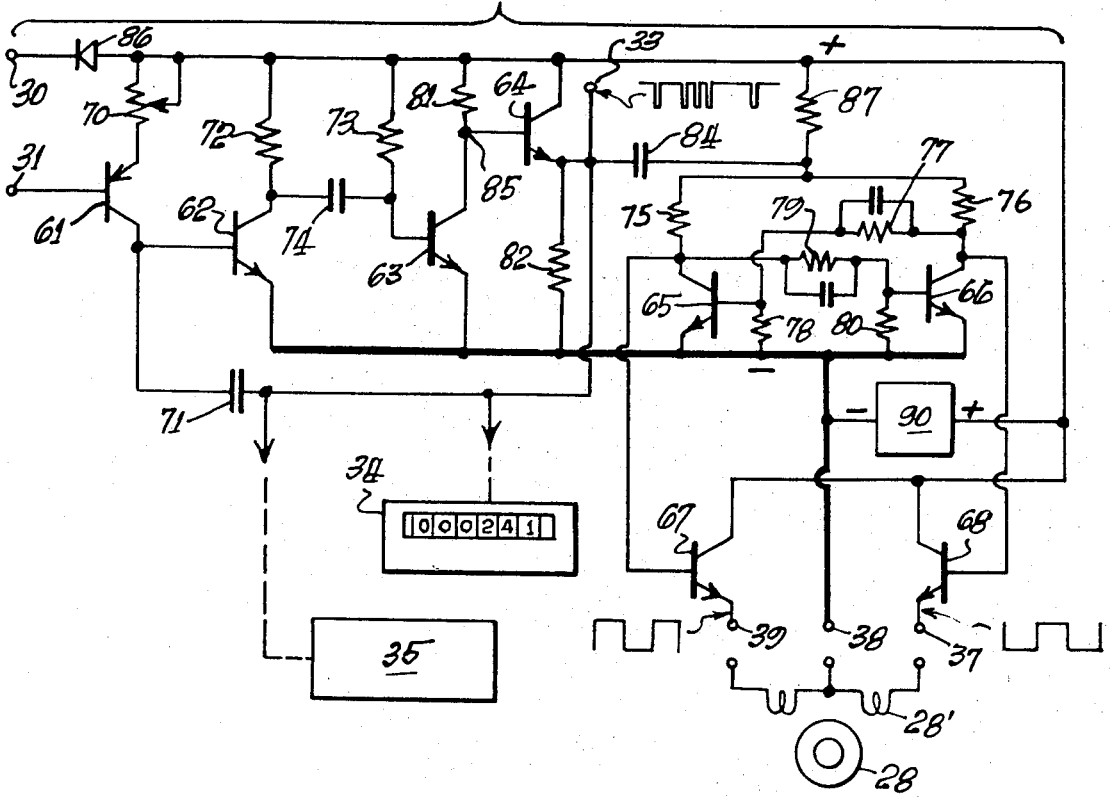
FIG. 4 is a detailed schematic diagram of a preferred form of the voltage-to-frequency converter and associated circuitry for driving the stepping motor.

Referring to the circuit of FIG. 4, the pulse generator portion of the circuit comprises transistors 61–64, its pulse output being at terminal 33. The pulses from this point are fed through a small capacitor 84 to a square-wave multivibrator which comprises transistors 65 and 66. These conduct alternately, being triggered into a transition by each pulse. The square wave frequency is, hence, half the repetition rate of the pulses. This multivibrator in turn drives a pair of power transistors 67, 68 in emitter-follower connection. Their emitters are connected to output terminals 37, 38, 39, which in turn are connected to the stepping motor stepping motor coils 28'.

Considering the circuitry of FIG. 4 in more detail, transistor 61 is connected as a constant-current element in the known manner. Its collector current is adjusted by means of the adjustable emitter resistor 70. This current, in conjunction with the timing capacitor 71, determines the pulse repetition rate for any given control voltage applied to input terminals 30, 31. The collector of current-element transistor 61 feeds the base of a transistor amplifier stage 62 whose emitter is grounded (the negative or common side of power supply 90 being considered as "ground" whether connected to earth or not) and which has a collector load resistor 72. This stage feeds a second similar stage 63, 73, 81 through coupling capacitor 74. This capacitor determines the length of each pulse, and is of relatively small capacitance, since the pulses should be relatively short. The last stage of the pulse generator circuit is an emitter follower 64 with emitter load resistor 82. The relation of control voltage to pulse repetition rate with this circuit is highly linear and precise. With a small loss in linearity, which is tolerable in many applications, the emitter follower stage 64, 82 may be omitted. The timing capacitor 71, output terminal 33, and coupling capacitor 84, would then be connected to the collector of transistor 63 at point 85.

At 86, adjacent input terminal 30, is shown a temperature-compensating diode. This is effectively in series opposition to the base-emitter junction of transistor 61. When it is of the same semiconductor material as transistor 61, e.g., silicon, it serves to compensate the dc operating point of transistor 61 against changes in temperature as effectively as the more conventional arrangements involving two transistors in a differential amplifier or "long-tailed pair" connection.

It is an important property of this circuit that the pulse rate is zero, i.e., it does not oscillate, when control voltage at terminal 31 is zero or negative with respect to terminal 30. Only when it is positive are pulses generated, the rate being proportional to the control voltage.

The square-wave multivibrator circuit 65, 66, etc. is of a conventional type. The collector of transistor 65 is cross-coupled to the base of transistor 66 through resistors 79, 80, and the collector of transistor 66 similarly coupled to the base of transistor 65 through resistors 77, 78. Common to the collector circuits 75, 76 is a resistor 87, to which the triggering pulses from the pulse generator are coupled through capacitor 84.

The collectors of transistors 65, 66 are coupled directly to the bases of the output stage 67, 68, which drive the stepping motor coils 28' ina conventional manner.

The pulse generator circuit operates as follows. Assume that device 63 has just cut off, and points 85 and 33 have risen approximately to positive supply voltage. Capacitor 71 has become charged, through transistor or device 64 (or resistor 81 if device 64 is omitted as described), and through the base-emitter junction of device 62. When capacitor 71 is fully charged, device 62 begins to cut off, which makes device 63 conduct suddenly. The left-hand side of capacitor 71 now assumes a negative potential, cutting off device 62 completely. The charge now leaks off relatively slowly through current element 61, at a rate determined by the control voltage at terminals 30, 31 and the setting of resistor 70. The discharge time is the interval between pulses. When capacitor 71 is discharged sufficiently, device 62 begins to conduct, forcing device 63 to cut off; and the cycle repeates. If the emitter follower 64 is used, the charging of capacitor 71 is more rapid, and it is found that the relation of pulse rate to control voltage is more linear.

The circuit comprising devices 65, 66 is a bistable multivibrator of known type. One device conducts and the other is cut off. Their roles are exchanged whenever a pulse is fed to the collector circuit via capacitor 84. Thus the frequency of the square wave generated by devices 65, 66 is half the repetition rate of the pulses.

A counter 34 of any suitable type may be fed from the pulse output terminal 33, to display digitally the area under any part of the curve 2 (FIG. 1) during which it is made active. Counter 34 may be of the type which prints the numbers.

The pulses may be recorded also, as by a magnetic recorder 35, FIGS. 1 and 4. The information on the graphic curve such as 2 can be stored much more compactly on magnetic tape or the like than by preserving the charts 1 themselves. Hence it is desirable to store large numbers of curves, such as gas chromatograms, in this manner. They can be converted back into graphic records, if desired, by playing the tapes into a pulse-rate discriminator, thence into a graphic chart recorder of any convenient type. In addition, the tape data may be stored in the memory of a computer. The computer can be programmed to search for peaks, or groups of peaks so stored, and to compare them with the pulse data on an "unknown" tape; thus unknown substances can be identified by playing pulse records of their chromatograms into a computer that has been provided with a suitable "library" of stored data and a suitable program. Procedures of this kind are compatible with the present invention, but not with integrating systems of prior types.

Figure 5:
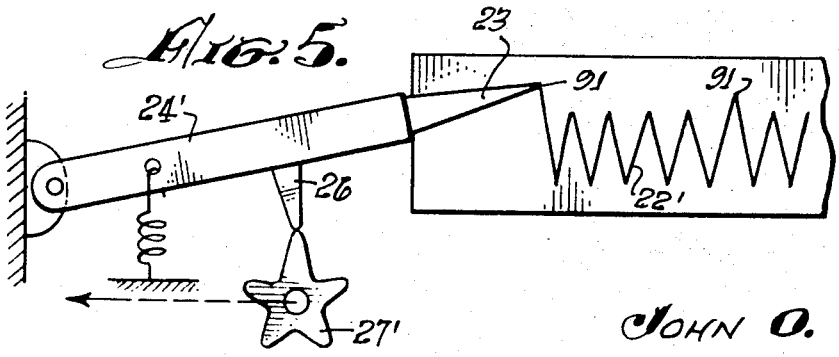
FIG. 5 is a diagram of an alternative form of cam for driving the integrator pen.

Referring now to FIG. 5, a modification 27' of the cam 27 (FIG. 1) is illustrated with an associated arm 24', pen 23, cam follower 26, and a portion of an integrator trace 22'. The difference is that the cam 27' has one lobe which is accented by a small difference in height, so that certain of the cycles of the trace 22' are accented for ease in counting. In FIG. 5, a 5-lobe cam is shown at 27', with one lobe 91 accented. In the trace 22', every fifth cycle 91 is slightly higher than the others. A cam having a different number of lobes may be used, such as 3.

I claim:
1. In a graphic data recorder system,
   a potentiometric chart recorder having an input means for recieving an electric input signal, a slide-wire means connected to said input means, a means to mark an analogue trace of said input signal on a movable chart, and a servo means connecting said input means to said marking means and said slidewire means;
   a voltage-to-frequency converter generating relatively short electrical pulses at a rate proportional to its input voltage, and having a pulse output terminal;
   a converter input circuit connecting said slidewire means to said voltage-to-frequency converter to derive said input voltage from said slidewire means as a known linear function thereof;
   a bistable flip-flop circuit connected to produce a square-wave driving output;
   control connections from said pulse output terminal to said flip-flop to change its state alternately in response to each successive pulse;
   a stepping motor,
   means to drive said motor from said square wave, and
   cam means connecting said motor mechanically to an auxiliary marking element to mark an oscillating integrator trace along a portion of said chart;
   said integrator trace having a slope and a spatial frequency linearly related to the instantaneous magnitude of said electrical input signal and thereby representing the integral of said analog trace.

2. A system as in claim 1, wherein:
said converter input circuit comprises a scale-factor adjusting potentiometer and a zero-suppression adjustment potentiometer,
said zero-suppression adjustment potentiometer being connected across said slidewire means.

3. A system as in claim 1, further comprising:
a speed reducer connected mechanically between said stepping motor and said cam, and
a pulse recording device having its input connected to said pulse output terminal to record said pulses for later playback,
said converter generating pulses at a relatively high repetition rate to provide a high-resolution signal to said pulse recording device, and
said speed reducer reducing the rate of oscillation of said auxiliary marking element to a range appropriate for visual interpretation of said integrator trace.

* * * * *